Dec. 5, 1933.   N. C. CHRISTENSEN   1,937,633
PROCESS OF TREATING ZINC ORES
Filed March 18, 1931   6 Sheets-Sheet 3

Fig. 3.

INVENTOR
Niels C. Christensen

Fig. 4.

Dec. 5, 1933.  N. C. CHRISTENSEN  1,937,633
PROCESS OF TREATING ZINC ORES
Filed March 18, 1931   6 Sheets-Sheet 5

Fig. 5.

INVENTOR
Niels C. Christensen

Fig. 6.

Patented Dec. 5, 1933

1,937,633

UNITED STATES PATENT OFFICE 1,937,633

PROCESS OF TREATING ZINC ORES

Niels C. Christensen, Salt Lake City, Utah

Application March 18, 1931. Serial No. 523,576

7 Claims. (Cl. 204—15)

This invention relates to processes for the recovery of zinc from its ores. The invention relates primarily to the treatment of zinc sulphide ores for the recovery of zinc therefrom as metal or as zinc sulphide. The main object of the invention is to treat the raw sulphide ores by hydrometallurgical methods without roasting the ores and to finally recover the zinc from them either as a metal by electrolysis or as a pure precipitated sulphide which may be used as such or from which the metal may be recovered also by electrolysis. It is also an object of the invention to recover the sulphur combined with the zinc in the sulphide ores as $H_2S$ for use in precipitating the zinc as ZnS (or for other uses) or for the recovery of elemental sulphur therefrom. In the treatment of the sulphide ores of zinc by this invention a smaller proportion of oxidized or carbonate ore of zinc is also treated and it is also an object of the process to recover the zinc from such ores. The chemical reagent used in the recovery of the zinc from these ores is sulphuric acid, used in suitable varying concentrations in the different steps of the process. It is an object of the invention to recover the $H_2SO_4$, used in decomposing the ores, (and dissolving the zinc out of the ores) either as such for further use in the process or in other marketable product.

The invention is related to the processes disclosed in my U. S. Patents 1,434,084, 1,415,797, 1,435,699, in that it utilizes some of the discoveries described in these patents. It aims, however, to obviate certain defects and limitations of the older processes which militate against their practical use and also aims to recover the zinc in final finished products other than zinc sulphate. The invention accomplishes these purposes by a combination of new steps with some of the steps of these older processes and also in combination with other processes now in common use. By these combinations the invention secures results which cannot be secured by the older processes and which are of great value and importance in connection with the treatment of zinc ores. The invention is applicable to the treatment of all classes of zinc ores such as zinc sulphide ores and concentrates and the so-called "complex" or mixed lead-zinc sulphide ores and concentrates, and is also applicable to the treatment of a proportion of oxidized or carbonate ores of zinc or mixed carbonate ores of zinc and lead in connection with the treatment of the sulphide ores. The terms "sulphide ores of zinc" and "oxidized zinc ores" will therefore be used in the description to cover these various types of ores.

As described in my U. S. Patent #1,434,084, if finely ground zinc sulphide ores or concentrates are mixed with a large excess of hot sulphuric acid of a concentration of 60% or higher the zinc is dissolved in the excess of hot acid as zinc sulphate and the sulphur is driven off as $H_2S$, the reaction proceeding as indicated below:

$$ZnS + H_2SO_4 = ZnSO_4 + H_2S$$

As noted in this patent, acids of concentration less than 60% have some dissolving action upon most zinc sulphide ores but a practically complete extraction of the zinc is possible only with acids of a concentration of 60% or higher. For example, in the treatment of a typical zinc-lead sulphide ore from Pioche, Nevada, treatment with hot 40% acid gave an extraction of only 32% of the zinc, with 50% acid an extraction of 55%, with 60% acid an extraction of 95%, with 65% acid an extraction of 98%, and with 75% acid 99%. As noted in the above patent the action of the hot acid upon the zinc sulphide and other constituents of the ore also varies with the concentration. Up to a concentration of approximately 70% the hot acid reacts with the ZnS to form $H_2S$ but above this concentration sulphur is liberated in increasing amounts with increase in acid concentration until with 95% acid substantially all of the sulphur is released as metallic sulphur as indicated in the following equation:

$$3ZnS + 4H_2SO_4 = 3ZnSO_4 + 4H_2O + 4S$$

Acids of a concentration up to 60% have little action upon galena except to form a thin superficial coating of $PbSO_4$ with the more concentrated acid. With increase in acid concentration above 60% more of the lead is sulphated until with 80% acid the sulphating may be complete with very finely ground ores. Up to approximately 70% concentration the silver in the ore is not dissolved to any appreciable extent but above this concentration is dissolved in increasing proportion with increase in acid concentration. Only the very concentrated hot acids have any action upon pyrite or chalcopyrite, even 95% acid having no appreciable action in the time of treatment required for the sulphation of the zinc.

Figure 1:
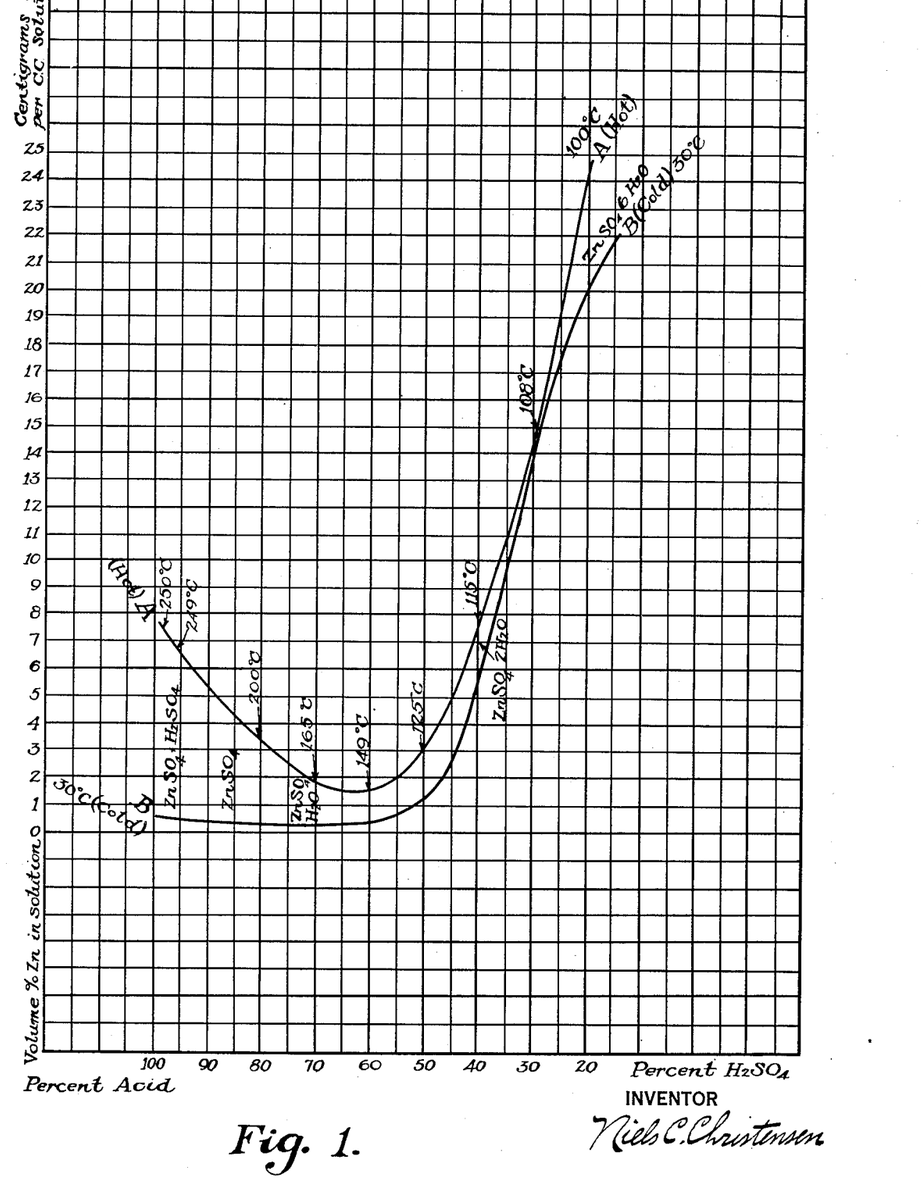
Figure 2:
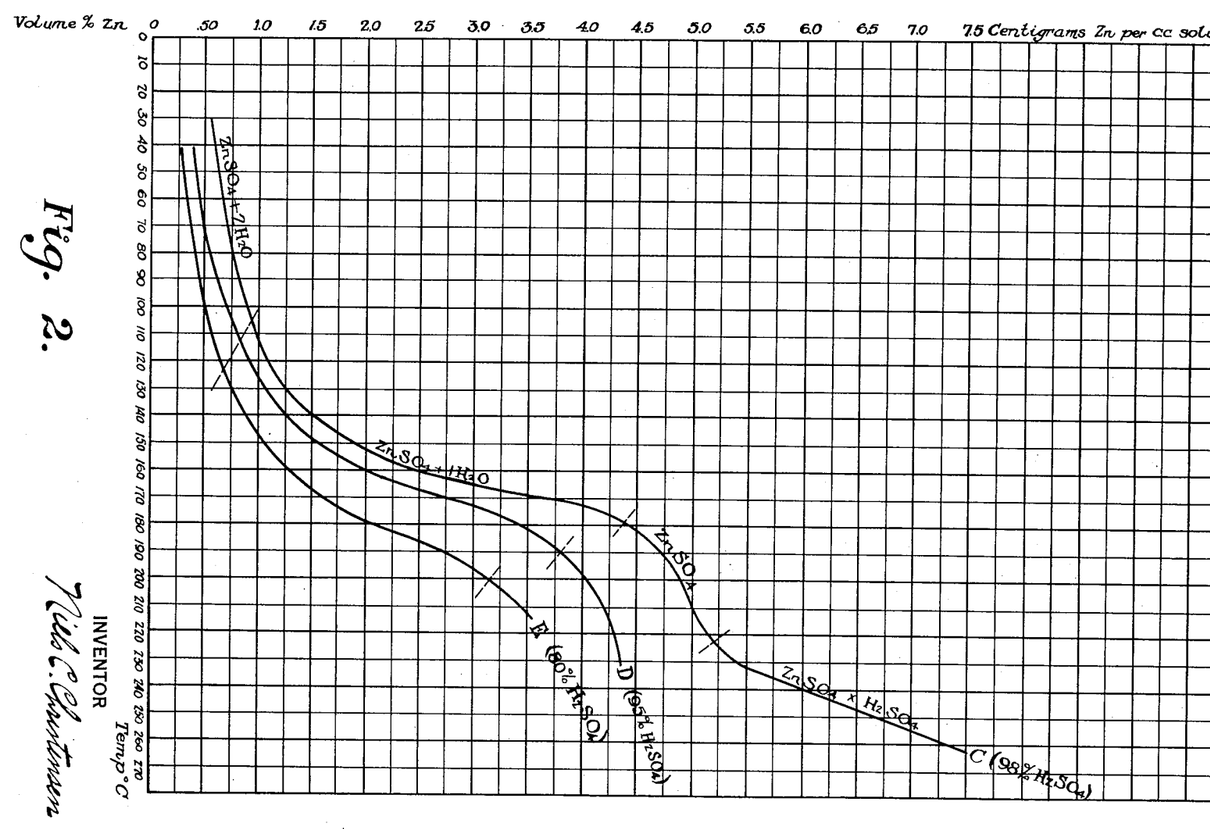
Figure 3:
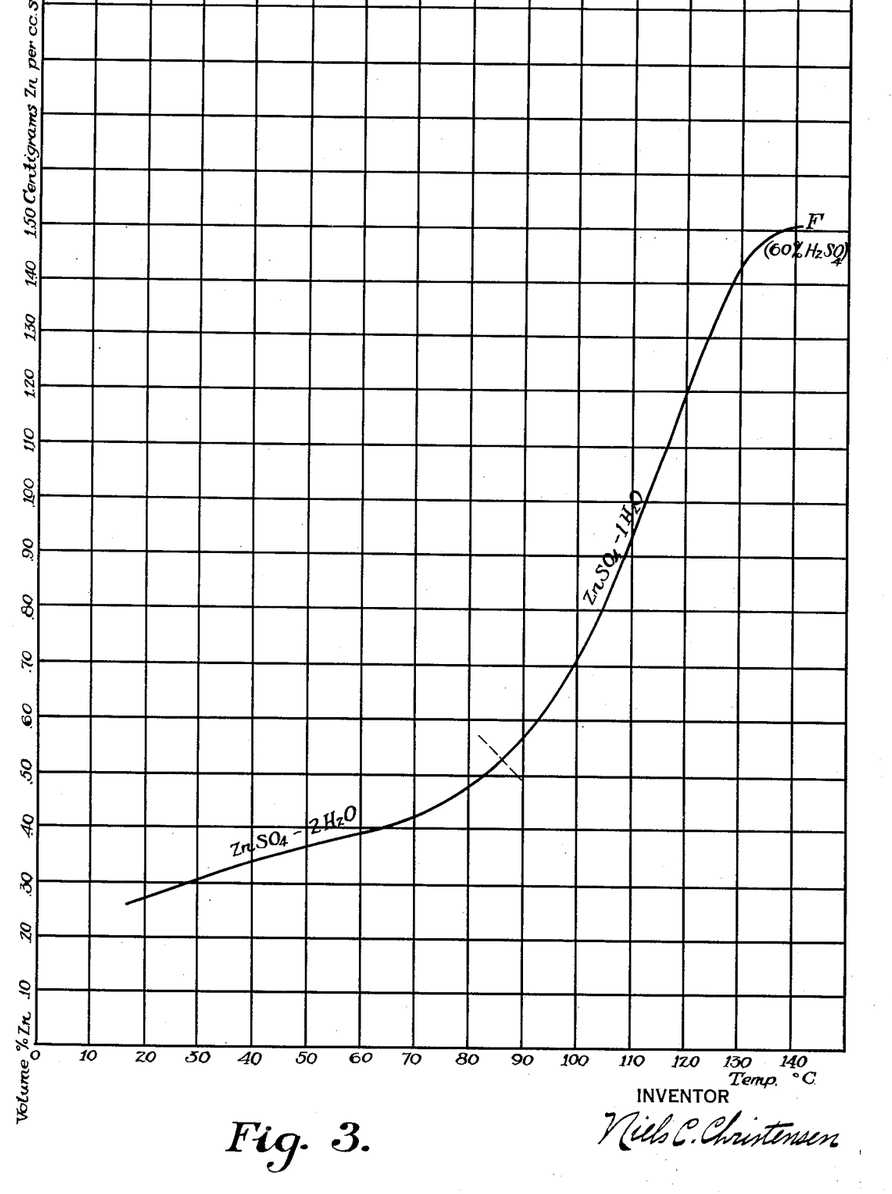

As noted in U. S. Patent 1,434,084, the solubility of $ZnSO_4$ in $H_2SO_4$ varies greatly with change in concentration and temperature. The appended curves from U. S. Patent 1,434,084 show this variation in solubility. Fig. 1 consists of two curves, A showing the solubility of ZnSO4 in H2SO4 of varying concentration at the boiling point of the different acids, and B showing the solubility of ZnSO4 in H2SO4 of varying concentration at 30° C. Fig. 2 consists of three curves, A, B, and C showing the solubility of ZnSO4 in 98%, 95%, and 80% acids respectively at different temperatures. Figure 3 consists of one curve showing the solubility of ZnSO4 in 60% H2SO4 at different temperatures. As also noted in this patent (U. S. Patent 1,434,084) to secure a substantially complete recovery of the Zn from the sulphide ores by agitation in mixture with the hot sulphuric acid it is necessary to use a sufficient excess of acid to dissolve the ZnSO4 which is formed, as otherwise the Zn is not sulphated and is not recovered either in the hot acid or in the subsequent water wash. A complete recovery of the zinc from these ores therefore requires the use of a very large quantity of acid. For example, if 65% acid is used, this acid will hold 1.3% Zn in solution (as ZnSO4) hot and .2% Zn cold, giving maximum available carrying power 1.1% Zn (as ZnSO4). These figures represent volumetric percentages i. e. grams of zinc in 100 c. c. of acid. As complete saturation results in poor extraction, a practical carrying power of the acid is one volume per cent zinc, i. e., 1 gram of zinc per 100 c. c. of acid. Since the specific gravity of 65% acid is 1.56 the acid in the mill circuit could dissolve only .64 grams of zinc per 100 grams of acid out of the ore as ZnSO4. The treatment of each ton of 19% ore would therefore require the handling of 30 tons of H2SO4 and the treatment of one ton of 58% zinc sulphide concentrate would require the handling of over 90 tons of acid. The handling of such large amounts of hot acid militate very seriously against the use of the process, which has therefore never come into practical commercial use. To attempt to cut down the volume of acid required by using acids above 70% is also not feasible owing to the very much greater difficulty of handling the more concentrated acids and the relatively slight decrease in tonnage of acid due to the increased specific gravity of the acids of higher concentration.

In treating zinc sulphide ores by the process of the above patent by agitating the ores with the hot sulphuric acid, I have found, as noted above, that sufficient hot acid must be used to entirely dissolve the ZnSO4 formed as otherwise a superficial coating of ZnSO4 is formed around the zinc sulphide particles which prevents entirely all further action of the acid on the particle. I have also found that if this zinc sulphate coating is continuously removed from the surface of the sulphide particles, during the treatment with the hot acid that the sulphating action continues until the zinc sulphide particles are all converted to ZnSO4, the sulphur being driven off as H2S, as indicated in the following equation:

$$ZnS + H_2SO_4 = ZnSO_4 + H_2S$$

I have also found that this zinc sulphate coating may be readily removed by grinding or attrition with small balls or pebbles during the treatment with the hot acid, making possible a complete sulphating of the ZnS in the ore by a treatment of from 15 to 30 minutes with only sufficient acid to make a thin pulp with the ore. The ZnSO4 thus formed remains as a solid mixed with the residual unattacked ore particles (silica, pyrite, galena, etc.). To recover the zinc sulphate from this mixture the excess acid is first removed by filtration (for reuse in the treatment of more ore) and the ZnSO4 and residual acid are then removed by washing with spent electrolyte from an electrolytic circuit or with water to form an acid zinc sulphate solution. This acid zinc sulphate solution contains some iron, manganese and other impurities which may be removed as later described.

In this treatment of the zinc sulphide ores by grinding with hot H2SO4 I have also found that the sulphating effect varies with the acid concentration. Acids below 50% have little effect. With from 50% to 60% acid the sulphating increases rapidly, and for best results the acid concentration should be above 60% during the entire treatment, preferably 65%. Since the sulphatizing of the ZnS uses up acid and thereby reduces the acid concentration, sufficient excess acid above 60% in concentration must be used so that the acid concentration does not fall below 60% (or preferably 65%) during the treatment, i. e., before all the ZnS is sulphated.

I have also found that the sulphating action is efficient and rapid only when the acid is near or at its boiling point and the treatment should therefore be carried out with the acid held at or close to this temperature. The sulphating action of the hot acid during the grinding varies with concentration, the stronger acids acting more rapidly on the ZnS and sulphating any PbS in the ore to a somewhat greater extent than when the ore is not ground during treatment with the acid. Whether acids stronger than 65% are used in the treatment of mixed Pb—Zn sulphide ores may depend upon whether or not it is desired to sulph'te the lead in the ore. Acids above 70% form S instead of H2S in proportion to the increase in concentration and cause a loss of acid and H2S, and are therefore not preferred over the acids of lower concentration for this reason as well as the greater difficulty of handling the more concentrated acid.

The foregoing method of grinding the ZnS ore during treatment with the hot acid makes possible the complete sulphation of the zinc sulphide in these ores by the use of a relatively small amount of acid as compared with the older process mentioned above. It also avoids the necessity of heating and cooling the acid used for treating the ore to precipitate the ZnSO4 therefrom, the ZnSO4 being formed and left in the sulphatized product as a solid and the hot excess acid filtered away from the solid ZnSO4 and residue and this acid being reused in the treatment of more ore. From the mixture of ZnSO4 and ore residue thus secured the ZnSO4 may be recovered by washing with the spent electrolyte from an electrolytic circuit thus making possible the combination of this process with electrolytic processes for the recovery of the zinc in metallic form as described below. From the mixture of ore residue and solid ZnSO4 secured in the process as above described, the ZnSO4 may also be dissolved if preferred, by means of water to form a zinc sulphate solution from which the zinc may be recovered as ZnS, by means of the H2S made in the process, as more fully described below. The precipitated ZnS thus recovered may be used as a paint pigment or for other similar purposes or may also be treated by electrolysis for the recovery of the zinc as metal as described below.

The application of the invention to ores of different types is briefly covered in the following description. The accompanying drawings illustrate the description and show in diagram the different steps of the process.

Figure 4:
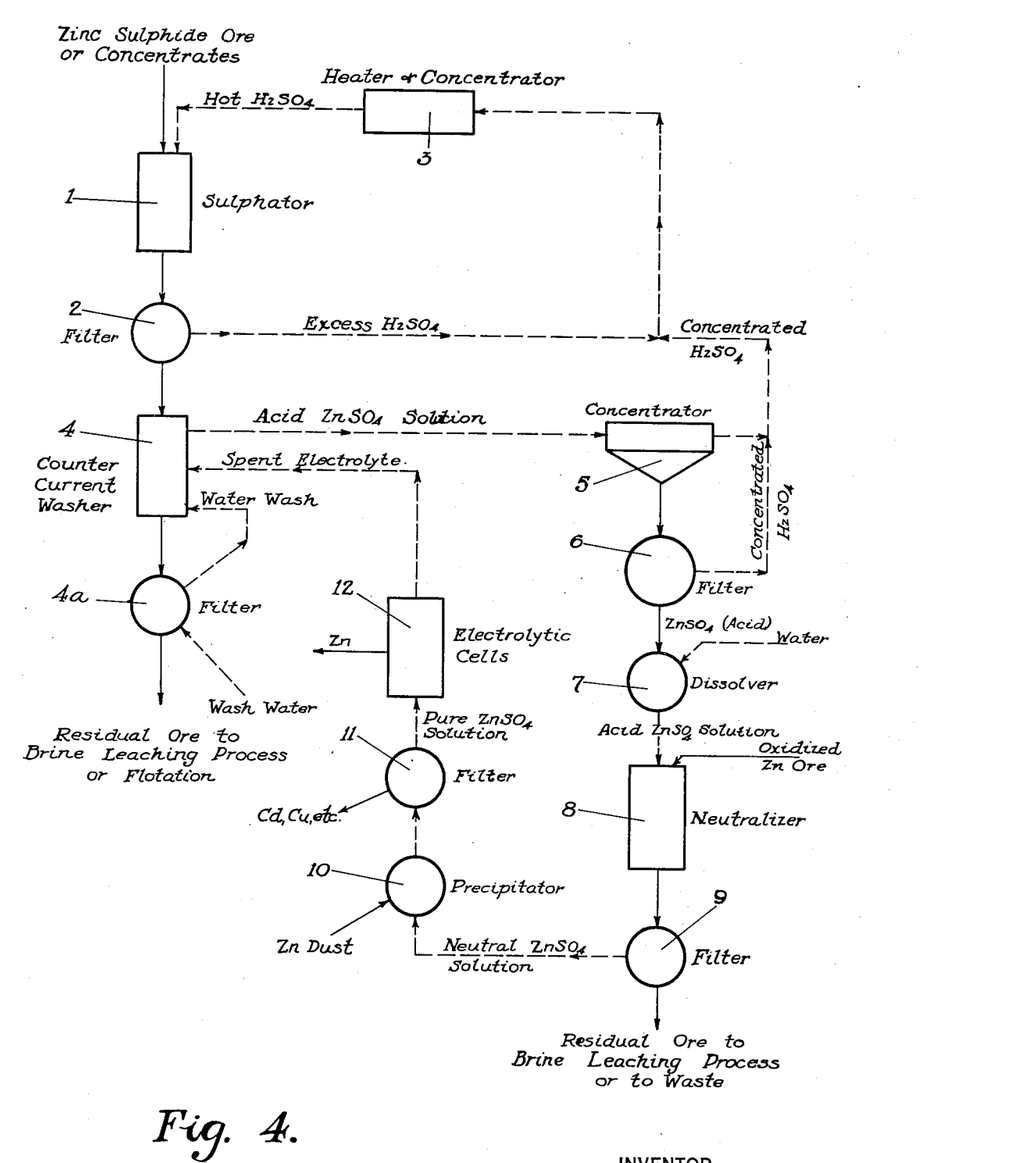
Figure 4 is a flow-sheet of the process as applied in connection with a low acid electrolytic circuit for the recovery of the zinc from solution as a metal.

The process of Fig. 4 is brief as follows: the ZnS, the finely comminuted zinc sulphide ore or concentrate is first ground together with the hot sulphuric acid with small quartz pebbles (or other acid-proof material), in an acid-proof mill (or other suitable grinding or attrition apparatus), called the sulphator (1). This device is kept hot by suitable jackets for the circulation of a suitable heating fluid. The time of treatment necessary to secure substantially complete sulphating of the ZnS for most ores will vary from 10 to 20 minutes. With acids of the preferred concentration (between 60% and 70%) the sulphur is driven off in this treatment as $H_2S$, which is utilized as later described. The hot mixture of excess acid, $ZnSO_4$ and ore residue from the sulphator (1) goes to the filter (2) where the excess acid is separated from the solids and returned through the heater and concentrator (3) to the head of the circuit for use in treating more ore. The filter cake containing the $ZnSO_4$ and ore residue is next washed free from $ZnSO_4$ and acid with spent electrolyte and finally with water preferably in a counter-current washer (4), or a washing system such as the standard arrangement of Dorr thickeners, or the standard arrangement of a series of filters for counter-current washing, or other suitable washing device. If the standard, or low acid, electrolytic process, such as that in use at Anaconda or Trail, is used, the spent electrolyte used for this washing operation may contain in the neighborhood of ten per cent $H_2SO_4$ and 5% Zn. This solution is first used to dissolve all the $ZnSO_4$ possible out of the filter cake and thereafter the residual $ZnSO_4$ and acid is washed away from the residue of treated ore with water. As will be noted by reference to the Fig. 1, a hot 10–15% $H_2SO_4$ will hold over 20% Zn as $ZnSO_4$ so that there is no difficulty in dissolving an amount of zinc equivalent to that precipitated in the electrolytic circuit from the sulphated ore in the spent electrolyte. The acid zinc sulphate washes from the counter current washer (4) are preferably mixed and concentrated in a suitable evaporator or concentrator (5) until the concentration of the acid reaches approximately 60% (or slightly more). As will be seen by reference to Fig. 1, this results in the precipitation of nearly all the $ZnSO_4$. This concentration is preferably carried out in three or more steps, the precipitated $ZnSO_4$ being removed at the end of each step so as to avoid the formation of an excessively thick $ZnSO_4$ sludge toward the end of the concentrating operation. This step is also preferably carried out in counter-current using the water evaporated from the acid $ZnSO_4$ solution to dissolve the precipitated $ZnSO_4$ and thus balance the heat of solution of the $ZnSO_4$ in the water against the heat of concentration of the acid solution. The precipitated $ZnSO_4$ is filtered out of the concentrated acid on the filter (6) and the acid is returned to the head of the circuit for the treatment of more ore. The precipitated $ZnSO_4$ containing some residual acid is dissolved in water (preferably from the concentrating operation as described) in the mixer or dissolver (7) to form a zinc sulphate solution. This solution contains some impurities such as iron, manganese, cadmium, etc., dissolved out of the ore together with the zinc. To remove these impurities oxidized zinc ore is mixed with this acid zinc sulphate solution in the neutralizer (8) to neutralize the acid. After the acid has been neutralized in the neutralizer (8), sufficient oxidizing agent (preferably $PbO_2$) is added to the mixture which is then agitated until the iron (and other oxidizable impurities) are precipitated. The residue of leached oxidized ore is then separated from the neutral zinc sulphate solution by filtration in the filter (9) and the zinc sulphate solution is treated with zinc (preferably zinc dust) to remove cadmium, copper, etc., in the precipitator (10). After separation of the precipitate in the filter (11) the pure zinc sulphate solution is electrolyzed in the electrolytic cells (12). The spent electrolyte from these cells (12) is again passed through the leaching circuit to take up its fresh load of zinc sulphate as described. If no oxidized ores or zinc calcines are available for neutralization of the acid in the $ZnSO_4$ filter cake from the filter (6) or if it is not desired to treat oxidized ores, this $ZnSO_4$ filter cake may be heated sufficiently to drive off the $H_2SO_4$ leaving anhydrous $ZnSO_4$, which is then dissolved in water to make a neutral zinc sulphate solution. The oxidizable impurities such as iron, etc., are then precipitated from the solution by the addition of an oxidizing agent, such as lead peroxide, and a small amount of zinc oxide or zinc carbonate ore. Thereafter the cadmium, copper, traces of Pb, etc., are precipitated by means of zinc dust and the clean zinc solution electrolyzed as previously described, the spent electrolyte being used over again to dissolve more $ZnSO_4$ out of more sulphated ore.

The treatment of the leached residue from the counter current washer (4) and filter (4a) will depend upon the character of the residue. If it contains lead it may be treated by the brine leaching process described in my U. S. Patent 1,539,711 for the recovery of the lead and silver, and the residue from this treatment may be treated by flotation to recover the pyrite which carries the gold and residual silver in the ore. If the residue contains no lead it may be treated by flotation for the recovery of the pyrite and gold and silver. The treatment of the residue of oxidized ore from the neutralizer 8 and filter 9 will also vary with the character of the residue. If it contains lead which after treatment will be present as lead sulphate, this may be recovered by leaching with brine, which may be slightly acidified so as to recover any silver in the ore.

Figure 5:
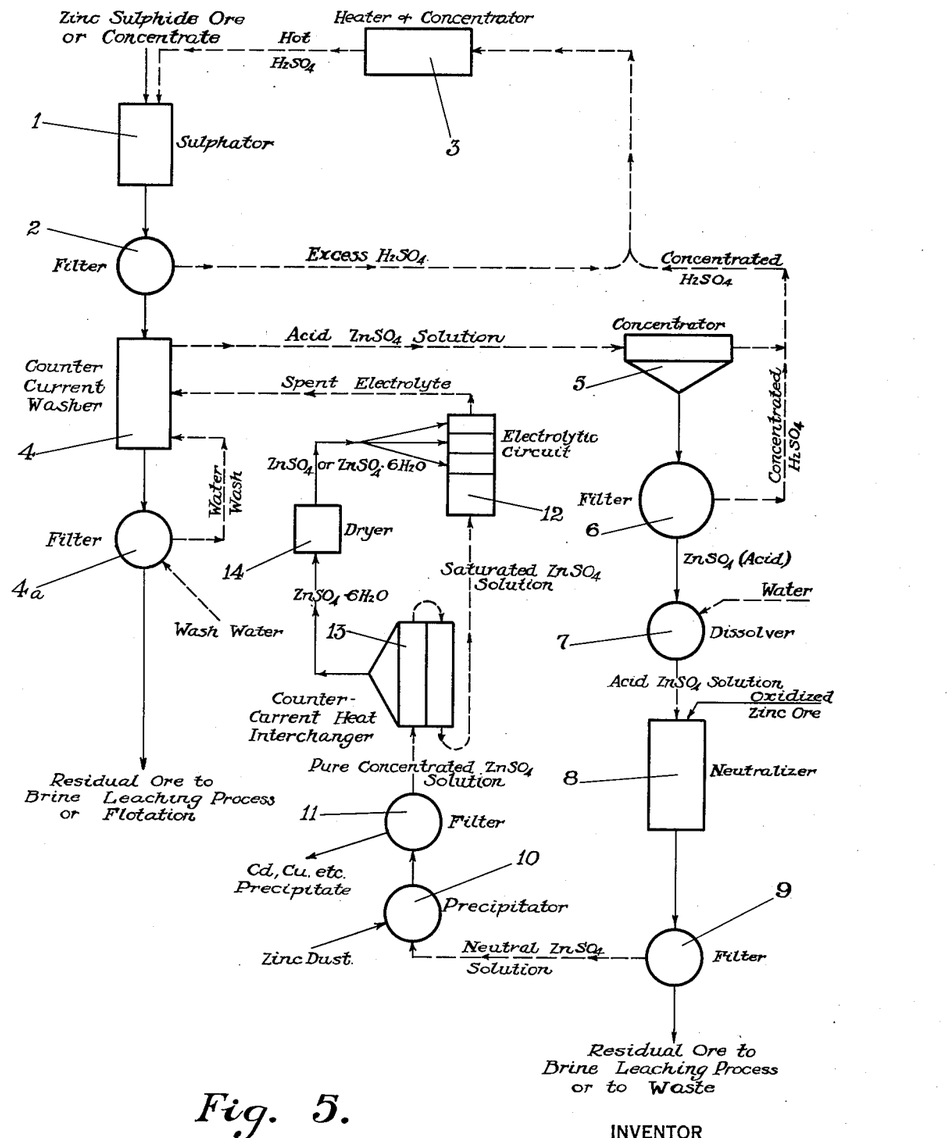
Fig. 5 is a flow sheet of the process used in connection with a high acid electrolytic circuit.

Figure 5 shows a modification of the process as applied to recovery of the zinc by electrolysis in a high acid electrolyte such as is used in the Tainton process. As will be noted by comparing the flow sheets of Figs. 4 and 5, substantially the only difference in the two cases is in the addition of part of the pure zinc sulphate in solid form in successive cells of the electrolytic plant so as to keep up the zinc concentration in the electrolyte as the acid concentration increases, and in the use of a higher acid concentration and a higher current density, and in the dissolving of the zinc sulphate out of the sulphated ore in a spent electrolyte of much higher acid concentration, and in the use of a much more concentrated neutral zinc sulphate solution entering the electrolytic plant. The spent electrolyte from the electrolytic cell (12) in this case may carry 300 g. H₂SO₄ (or more) and approximately 80 grams of Zn (as ZnSO₄) per litre. By reference to Fig. 1 it will be seen that this solution can carry between 14 and 15% Zn (as ZnSO₄). The spent electrolyte is therefore able to take up an additional 6%-7% Zn in the counter-current washer (4), the residual ZnSO₄ being washed out with water in the filter (4a) and counter-current washer (4). In this case the ZnSO₄ from the filter (6) is dissolved with just sufficient hot water in the dissolver (7) and neutralized with the oxidized ore in the neutralizer (8) so as to form a hot approximately saturated ZnSO₄ solution. After treating this solution with zinc dust to remove cadmium, copper, and other impurities, this hot concentrated solution is cooled in the counter-current heat interchanger and crystalizer (13) thus precipitating out part of the ZnSO₄ as ZnSO₄-6H₂O and cooling the solution before its entrance to the electrolytic circuit (12). The precipitated ZnSO₄-6H₂O is added to the cells near the end of the electrolytic circuit as indicated in the flow sheet to maintain a sufficiently high zinc concentration, as the acid builds up in the circuit, to permit the use of a high acid concentration and high current density. If desired, the ZnSO₄·6H₂O may preferably be heated in a suitable dryer (14) to form anhydrous ZnSO₄ before its addition to the electrolytic circuit. Either the ZnSO₄·6H₂O or the anhydrous ZnSO₄ are preferably added to the electrolytic circuit by dissolving in the electrolyte in suitable agitators between separate divisions of cells in the latter part of the circuit By the addition of the ZnSO₄ to the solution in the electrolytic circuit it is possible to operate with a very high acid concentration and high current density without depleting the zinc in the circuit below the limit necessary to secure a high current efficiency. For example, starting with a substantially saturated neutral electrolyte carrying 200 g. Zn per litre, it is possible to precipitate all of this zinc by the independent addition of more ZnSO₄ as the zinc in solution is depleted. It is thus possible to operate with acid concentration of 30% to 35%, or even slightly higher, since these solutions will carry from 114 to 110 g. of zinc per litre which is sufficient to give an economical current efficiency at very high current densities. It is thus possible by operating at these high current densities to cut the required anode and cathode surface in the electrolytic plant to less than half than that required in the circuit ending with the lower acid electrolyte.

Figure 6:
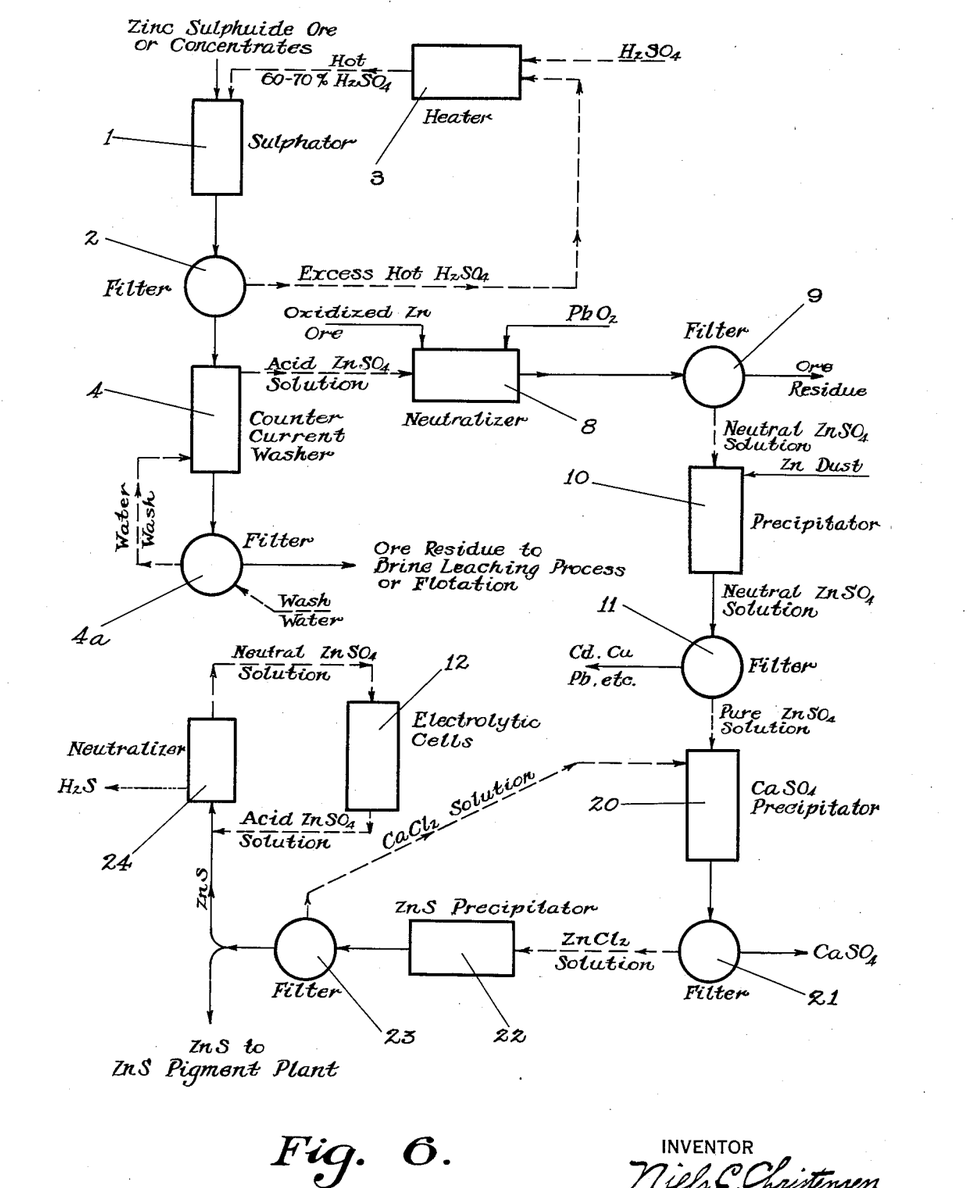
Fig. 6 is a flow sheet of the process as applied in connection with the recovery of the zinc as a sulphide and the treatment of the sulphide by electrolysis for the recovery of the zinc as a metal. Though the flow sheets illustrate a continuous operation, the process may be carried out in batches.

If it is desired to operate the electrolytic circuit with very concentrated ZnSO₄ solution and low acid concentration so as to be able to use a very high current density with a high current efficiency this may be done by the modification of the process shown in Fig. 6. In this case the zinc sulphide ore or concentrate is treated in the sulphator (1) with the hot acid (60-70% H₂SO₄) as previously described. The excess of hot acid is separated in the filter (2) and returned to the head of the circuit for the treatment of more ore, through the heater (3) in which the fresh acid consumed in treating the ore is also added as indicated. The ZnSO₄ is then washed out of the filter cake from (2) with water in a suitable washer (4) (preferably a counter current type) and filter (4a). The tailings from this treatment may go to a brine leaching or flotation treatment as previously described. The acid ZnSO₄ solution from the washer (4) is now neutralized with oxidized zinc ore (or zinc calcines) in a suitable agitator or neutralizer (8) and the impurities oxidized with a suitable oxidizing agent (such as lead peroxide) and the iron and other impurities removed together with the residue of treated oxidized ore in the filter (9). If it is not desired to treat oxidized zinc ores the acid ZnSO₄ solutions may be concentrated to 60% H₂SO₄ and the precipitated ZnSO₄ may be filtered out of the concentrated acid and dried to form anhydrous ZnSO₄ by heating to drive off the H₂SO₄. The anhydrous ZnSO₄ may then be dissolved in water and the impurities may be oxidized and precipitated as previously described to form the neutral ZnSO₄ solution. The neutral ZnSO₄ solution is then treated with zinc dust in the precipitator (10) to precipitate the traces of lead and the copper and cadmium, which are removed from solution in the filter (10). The clean neutral ZnSO₄ solution is now mixed with a CaCl₂ solution in the precipitator (20) precipitating the sulphion from solution as CaSO₄ and forming a ZnCl₂ solution as indicated in the following equation, $$ZnSO_4 + CaCl_2 = ZnCl_2 + CaSO_4$$

(The CaSO₄ is separated from the ZnCl₂ solution in the filter (21). The zinc is then precipitated from this zinc chloride solution in the precipitator (22) by means of H₂S for example that generated by treatment of the zinc sulphide ore in the sulphator (1) and a suitable lime compound by one of the following methods: the solution may be treated with the H₂S together with finely divided CaCO₃ as described in my U. S. patent application 66,400, filed Nov. 2, 1925, (now Patent No. 1,886,162), thus precipitating the zinc as ZnS and forming CaCl₂ in solution as indicated in the following equation:

$$ZnCl_2 + CaCO_3 + H_2S = ZnS + CaCl_2 + H_2O + CO_2$$

or the H₂S may be absorbed in an emulsion of Ca(OH)₂ to form a Ca(SH)₂ solution and this solution may be used to precipitate the zinc directly as indicated in the following equation:

$$ZnCl_2 + Ca(SH)_2 = ZnS + CaCl_2 + H_2S,$$

or preferably by mixing the Ca(SH)₂ solution with finely divided CaCO₃ in equimolecular proportion to the Ca(SH)₂ and using this mixture to precipitate the zinc as indicated below:

$$2ZnCl_2 + Ca(SH)_2 + CaCO_3 = 2ZnS + 2CaCl_2 + CO_2 + H_2O$$

and as described in my copending U. S. application No. 493,685, filed Nov. 5, 1930 and in No. 565,153, filed Sept. 25, 1931. In all these processes the zinc is precipitated as ZnS and the chlorine remains in solution as CaCl₂. The CaCl₂ solution thus formed is used to precipitate the CaSO₄ as described above and as indicated in the flow sheet of Fig. 6. The CaSO₄ filtered out in the filter (20) may be used for making high grade gypsum plaster or for other purposes. The precipitated zinc sulphide is filtered out of the CaCl₂ solution in the filter (23) and treated with exit solution from the electrolytic circuit (12), in the neutralizer (24), the acid in the solution being neutralized and the solution regenerated by the formation of ZnSO4, and the H2S being driven off as indicated in the following equation:

$$ZnS + H_2SO_4 = ZnSO_4 + H_2S$$

A concentrated ZnSO4 solution (preferably hot) is used in closed circuit with the neutralizer (22) and electrolytic cells (12) and is rapidly circulated so as to prevent the acid generated by the electrolysis building up to any appreciable concentration. All the cells in the electrolytic circuit may thus be operated continuously with a nearly neutral hot concentrated zinc sulphate solution, making it possible to use very high current densities with a high current efficiency. The H2S generated in the neutralizer may be returned to the sulphhydrate plant or may be burned in a Claus kiln to recover the sulphur, or may be utilized for other purposes. Traces of chlorine may be removed from the neutralized solution before its return to the electrolytic cells by the addition of silver sulphate to the solution. The silver chloride thus precipitated may be treated to form silver sulphate again and the silver thus be used over again for this purpose.

If desired the ZnS from the filter (23) may be dried and heated to form a zinc sulphide paint pigment as described in my U. S. patent applications Nos. 493,685 and 565,153, instead of going to the electrolytic plant.

As previously noted the process is adapted to the treatment of all classes of zinc sulphide ores and concentrates and together with these for the treatment of oxidized or carbonate ores. It is especially adapted, when used in connection with the brine leaching process of my U. S. Patents 1,539,711 and 1,539,712, for the treatment of bulk concentrates from complex lead-zinc-iron sulphide ores, and for the treatment of mixed lead zinc carbonate ores. By this combination of processes the zinc is first extracted from the concentrates by the process described above and the lead and silver are then extracted by the brine leaching process mentioned above. The pyrite and residual silver and the gold may then be recovered from the brine-leached residue in a pyrite concentrate by flotation and the pyrite concentrate may then be treated by the cyanide process, preferably after a chloridizing roast, for the recovery of the silver and gold, leaving a high grade iron product which may be marketable. The SO2 produced in roasting the pyrite concentrate may be used for the production of H2SO4, liquid SO2 or may be mixed with the H2S from the leaching operations to produce sulphur as indicated in the following equation:

$$2H_2S + SO_2 = 2H_2O + 3S$$

By such a combination of processes used in connection with this invention, described herein, a substantially complete recovery of all the metals in a complex lead-zinc-iron sulphide ore may be recovered in valuable marketable products.

Having described my process what I claim and desire to patent is:

1. The process of treating zinc sulphide ores, concentrates, and the like, which comprises grinding said initial material with hot relatively concentrated sulphuric acid in an amount which is only a small fraction of that amount which would be required to dissolve the zinc sulphate formed by said treatment, and thereby decomposing zinc sulphide in said initial material and forming zinc sulphate therefrom in solid form, and thereafter separating excess acid out of its mixture with said solid zinc sulphate and ore residue, and returning said acid for the treatment of more of the initial material as described, and dissolving said solid zinc sulphate and residual acid in water to form an acid zinc sulphate solution and separating said solution from said ore residue, and neutralizing the acid in said solution, and treating the neutral zinc sulphate with an amount of calcium chloride sufficient to react with the zinc sulphate in said solution and form zinc chloride.

2. Process as in claim 1, in which the acid initial zinc sulphate solution, is treated with an oxidized zinc compound and an oxidizing agent to neutralize and purify said solution, and then is treated with metallic zinc to precipitate metals below zinc in the electromotive series.

3. Process as in claim 1, in which the acid initial zinc sulphate solution, is treated with an oxidized zinc compound and an oxidizing agent to neutralize and purify said solution, and this is treated with metallic zinc to precipitate metals below zinc in the electromotive series and thereafter calcium chloride is added to the purified zinc sulphate solution, precipitating calcium sulphate, and treating the zinc chloride solution with H2S and a basic calcium compound to precipitate ZnS.

4. Process as in claim 1, in which the initial zinc sulphate solution is purified and then treated with calcium chloride, the precipitated CaSO4 removed and calcium sulphhydrate added to the ZnCl2 solution, to precipitate ZnS.

5. A process of treating zinc sulphide ores, concentrates and like material containing ZnS, which comprises grinding said initial material with hot concentrated sulphuric acid, to convert the ZnS into solid ZnSO4, the sulphuric acid being in substantial excess over the amount theoretically needed for that reaction, but being only a small fraction of the amount which would be needed to dissolve all of the ZnSO4 formed, separating the excess of concentrated sulphuric acid from the sulphated residue, dissolving the solid ZnSO4 with residual acid adhering thereto, in water to form an acid solution of zinc sulphate, and separating such solution from the ore residue, treating such acid solution with an oxidized zinc compound and an oxidizing agent, to neutralize and purify the same, treating the solution with metallic zinc to precipitate metals below zinc in the electromotive series of metals, and treating the so purified ZnSO4 solution with CaCl2 solution to precipitate CaSO4 and to form a ZnCl2 solution, treating the latter with a sulphide capable of precipitating ZnS, removing the latter and washing it free from soluble chlorides, and adding said ZnS to the electrolyte in an electrolytic circuit to form ZnSO4 therein, and electrolyzing the last mentioned liquor to recover metallic zinc therefrom.

6. A process of treating zinc sulphide ores, concentrates and like material containing ZnS, which comprises grinding said initial material with hot concentrated sulphuric acid, to convert the ZnS into solid ZnSO4, the sulphuric acid being in substantial excess over the amount theoretically needed for that reaction, but being only a small fraction of the amount which would be needed to dissolve all of the ZnSO4 formed, separating the excess of concentrated sulphuric acid from the sulphated residue, dissolving the solid ZnSO4 with residual acid adhering thereto, in an aqueous liquid to form an acid solution of zinc sulphate, and separating such solution from the ore residue, treating such acid solution with an oxidized zinc compound and an oxidizing agent, to neutralize and purify the same, treating the solution with metallic zinc to precipitate metals below zinc in the electromotive series of metals, and treating the so purified ZnSO4 solution with calcium chloride solution to precipitate calcium sulphate and leave a solution of zinc chloride, and thereafter treating said zinc chloride solution with a sulphide compound, to precipitate the zinc in the form of sulphide.

7. A process of treating zinc sulphide ores, concentrates and like materials containing ZnS, which comprises grinding said initial material with hot concentrated sulphuric acid, to convert the ZnS into solid ZnSO4, the sulphuric acid being in substantial excess over the amount theoretically needed for that reaction, but being only a small fraction of the amount which would be needed to dissolve all of the ZnSO4 formed, separating the excess of concentrated sulphuric acid from the sulphated residue, dissolving the solid ZnSO4 with residual acid adhering thereto, in an aqueous liquid to form an acid solution of zinc sulphate, and separating such solution from the ore residue, treating such acid solution with an oxdized zinc compound and an oxidizing agent, to neutralize and purify the same, treating the solution with metallic zinc to precipitate metals below zinc in the electromotive series of metals, and treating the so purified ZnSO4 solution with calcium chloride solution to precipitate calcium sulphate and leave a solution of zinc chloride, and thereafter treating said zinc chloride solution with calcium sulphhydrate to precipitate the zinc in the form of sulphide.

NIELS C. CHRISTENSEN.